(12) United States Patent  
Wagner

(10) Patent No.: US 7,761,191 B1  
(45) Date of Patent: Jul. 20, 2010

(54) MANAGEMENT OF OPERATION OF AN INTEGRATED CIRCUIT

(75) Inventor: Barry A. Wagner, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 71 days.

(21) Appl. No.: 11/609,755

(22) Filed: Dec. 12, 2006

(51) Int. Cl.
*G06F 19/00* (2006.01)

(52) U.S. Cl. .......................... 700/299; 702/21; 438/109

(58) Field of Classification Search ......... 700/299–300, 700/98; 702/21, 130, 132; 438/109; 365/211, 365/193

See application file for complete search history.

(56) References Cited

U.S. PATENT DOCUMENTS

| | | | | |
|---|---|---|---|---|
| 4,625,128 A * | 11/1986 | Boeckmann | ................ | 327/512 |
| 5,446,696 A | 8/1995 | Ware et al. | | |
| 5,502,838 A * | 3/1996 | Kikinis | .................. | 713/501 |
| 5,705,957 A * | 1/1998 | Oka et al. | .................. | 331/66 |
| 6,021,076 A | 2/2000 | Woo et al. | | |
| 6,217,213 B1 * | 4/2001 | Curry et al. | ................. | 374/178 |
| 6,373,768 B2 | 4/2002 | Woo et al. | | |
| 6,496,404 B1 * | 12/2002 | Fiedler et al. | ................ | 365/63 |
| 6,553,452 B2 | 4/2003 | Garlepp et al. | | |
| 6,947,865 B1 * | 9/2005 | Mimberg et al. | ............ | 702/130 |
| 6,996,791 B2 * | 2/2006 | Brunkhorst et al. | ............ | 716/4 |
| 7,050,959 B1 * | 5/2006 | Pollard, II et al. | ............. | 703/21 |
| 7,127,368 B2 * | 10/2006 | Choi | ......................... | 702/130 |
| 7,228,568 B2 * | 6/2007 | Abe et al. | ..................... | 726/31 |
| 7,412,619 B2 * | 8/2008 | Zimmer et al. | ................. | 714/6 |
| 7,463,542 B2 * | 12/2008 | Lovett | ........................ | 365/212 |
| 2003/0103402 A1 * | 6/2003 | Tran et al. | ................... | 365/211 |
| 2004/0204899 A1 * | 10/2004 | Gunther et al. | ............ | 702/132 |
| 2005/0146969 A1 * | 7/2005 | Murakuki et al. | ........ | 365/225.7 |
| 2006/0007722 A1 * | 1/2006 | Nordal et al. | ................. | 365/65 |
| 2006/0109707 A1 * | 5/2006 | Happ et al. | ................. | 365/163 |

OTHER PUBLICATIONS

Chiueh et al., A dynamic Thermal Management crcuit for system-on-chip Design, 2001, University of Southern Califorinia, IEEE, p. 577-580.*

* cited by examiner

*Primary Examiner*—Kidest Bahta  
(74) *Attorney, Agent, or Firm*—Berkeley Law & Technology Group, LLP

(57) ABSTRACT

Disclosed are embodiments that may facilitate management of operation of an integrated circuit (IC) including adjustment of the IC. The adjustment may be based at least in part on a proximity of a temperature of the IC relative to a predetermined temperature.

20 Claims, 6 Drawing Sheets

MANAGEMENT OF OPERATION OF AN INTEGRATED CIRCUIT

BACKGROUND

1. Technical Field

The subject matter disclosed herein generally relates to management of operation of an integrated circuit.

2. Information

As an integrated circuit (IC) becomes more capable (i.e., more dense and faster), various factors may affect its operation. For example, one factor that may affect the operation of an IC may be thermal effects. Thermal effects may originate from a variety of sources such as, but not limited to, operation of the IC itself, operating environment, processing speed, density, etc.

During operation, these factors may change. That is, the IC may start out as operating within normal limits, but as the operations continue, the IC may start to be affected by some of these factors. Continuing with the example of thermal effects, at start of operation, the IC may be cool enough that thermal effects may not be of concern. However, as the IC continues to operate, the IC may start to be affected by the thermal effects (i.e., become hotter), which in turn, may have an effect on data handled by the IC.

BRIEF DESCRIPTION OF THE DRAWINGS

Embodiments are illustrated by way of example and not by way of limitation in the figures of the accompanying drawings, in which like references may indicate similar elements and in which.

DETAILED DESCRIPTION

In the following description, embodiments will be disclosed. For purposes of explanation, specific numbers, materials, and/or configurations are set forth in order to provide a thorough understanding of the embodiments. However, it will also be apparent to one skilled in the art that the embodiments may be practiced without one or more of the specific details, or with other approaches, materials, components, etc. In other instances, well-known structures, materials, and/or operations are not shown and/or described in detail to avoid obscuring the embodiments. Accordingly, in some instances, features are omitted and/or simplified in order to not obscure the disclosed embodiments. Furthermore, it is understood that the embodiments shown in the figures are illustrative representations and are not necessarily drawn to scale.

References throughout this specification to "one embodiment" or "an embodiment" means that a particular feature, structure, material, and/or characteristic described in connection with the embodiment is included in at least one embodiment. Thus, the appearances of the phrases "in one embodiment" and/or "in an embodiment" in various places throughout this specification are not necessarily all referring to the same embodiment. Furthermore, the particular features, structures, materials, and/or characteristics may be combined in any suitable manner in one or more embodiments.

Figure 1:
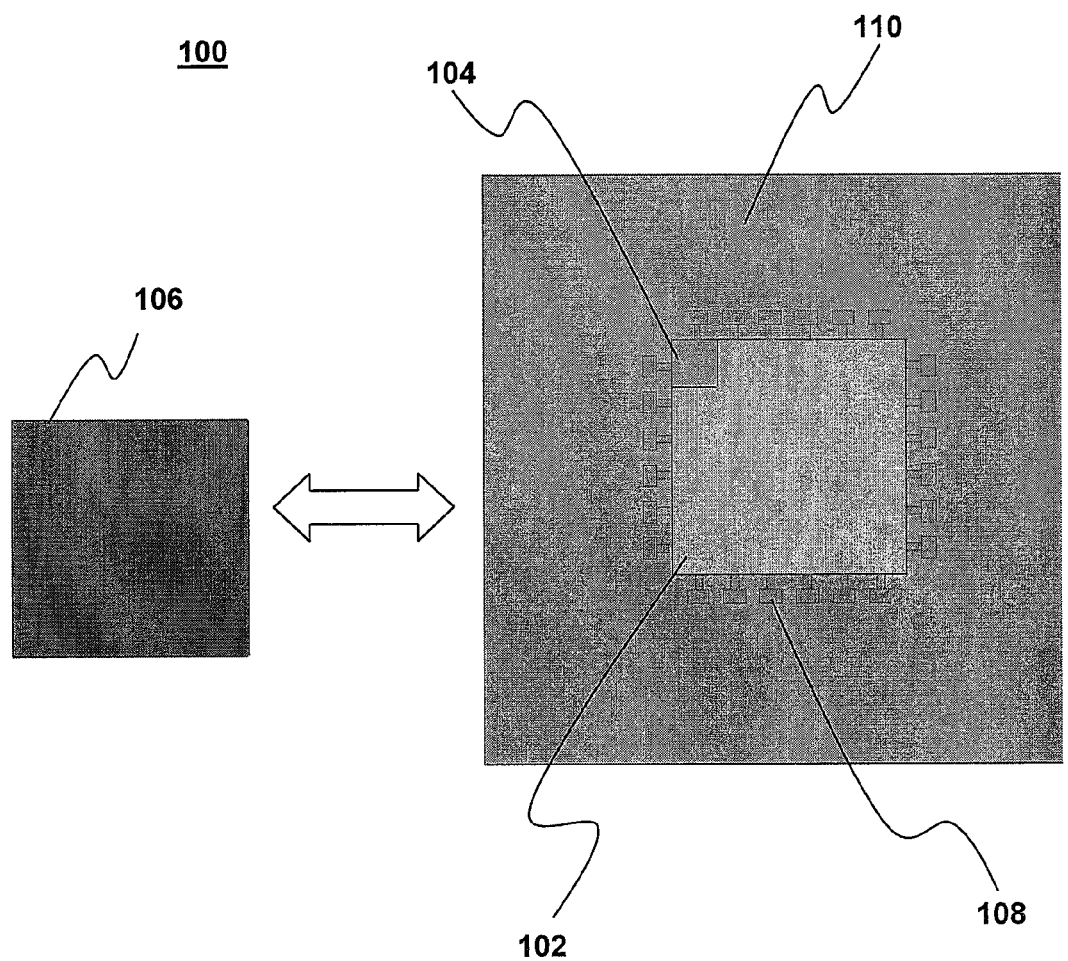
FIG. 1 illustrates schematically an apparatus for management operation of an integrated circuit in accordance with one embodiment.

FIG. 1 illustrates schematically an apparatus for management of operation of an integrated circuit in accordance with one embodiment. In FIG. 1, apparatus 100 may include an integrated circuit (IC) 102, a temperature sensor, and a controller 106. Additionally shown in FIG. 1, are some contacts 108 and a package 110. In the embodiment illustrated, temperature sensor 104 may be included as part of the IC 102. Further, as will be described, controller 106 may be communicatively coupled with the IC 102 and the temperature sensor 104.

As shown in FIG. 1, controller 106 may be capable of receiving an indication of a proximity of a temperature of the IC relative to a predetermined temperature. Responsive to the received indication, controller 106 may be capable of adjusting, operation of the IC 102 based at least in part on the proximity of the temperature of the IC relative to the predetermined temperature.

In one embodiment, IC 102 may comprise of a computer memory such as, but not limited to, random access memory (RAM) type computer memory including dynamic RAM (DRAM) type memory. However, it should be appreciated that IC 102 may comprise of a wide variety of ICs such as, but not limited to, static random access memory (SRAM), fast page mode dynamic random access memory (FPM DRAM), extended data-out dynamic random access memory (EDO RAM), synchronous dynamic random access memory (SDRAM), double data rate synchronous dynamic RAM (DDRSDRAM), video RAM (VRAM), complimentary metal oxide semiconductor RAM (CMOS RAM), double data rate RAM (DDR RAM), central processing unit (CPU) type IC device, graphics processing unit (GPU) type IC device, etc. That is, functional devices that may have various integrated components such as diodes, transistors, capacitors, resistors, and the like, and accordingly, the claimed subject matter is not limited in these respects.

In one embodiment, temperature sensor 104 may comprise of a temperature sensor capable of providing an indication of a change in the IC 102 such as, but not limited to, a change in voltage and/or current associated with a predetermined portion of the IC 102. Alternatively, temperature sensor 104 may comprise of one or more memory cells included as part of the IC 102. In another embodiment, temperature sensor 104 may comprise of one or more registers included as part of the IC 102 capable of changing state. It should be appreciated that temperature sensor 104 may comprise of a variety of semiconductor based type devices such as, but not limited to, thermocouple type devices, thermistor (i.e., resistance temperature devices) type devices, change of state type devices, dissimilar material based type devices, and so forth, and accordingly, the claimed subject matter is not limited in these respects.

In one embodiment, controller 106 may comprise of a microcontroller including a memory controller. In another embodiment, controller 106 may comprise of a controller capable of interrupting the operation of the IC 102. As will be described in further detail, interruption of the operation of the IC 102 may include increasing and/or decreasing the operating frequency of the IC 102. It should be appreciated that controller 106 may comprise of a variety of controllers, and accordingly, is not limited in these respects.

In the embodiment illustrated in FIG. 1, controller 106 is shown as being in proximity to the IC 102. However, it should be appreciated that controller 106 may be located in a variety of locations such as, but not limited to, a separate location on a mother board. Alternatively, controller 106 may comprise of a controller included as part of an IC, and accordingly, the claimed subject matter is not limited in these respects.

Continuing to refer to FIG. 1, in a non-limiting example of an embodiment of the claimed subject matter, controller 106 may comprise of a controller capable of facilitating and/or monitoring operation of the IC 102. As the temperature of the IC 102 reaches a proximity of a predetermined temperature such as, but not limited to, a predetermined temperature of 85 degrees Celsius, controller 106 may receive an indication from the temperature sensor 104, where the communication of the indication may be facilitated by contacts 108 through package 110 on a electronic board, such as but not limited to, a printed circuit board. Responsive to the received indication, controller 106 may interrupt the operation of the IC 102, which may include increasing and/or reducing the operation of one or more memory cells of the IC 102. Increasing and/or reducing the operation may involve increasing a refresh rate of the memory. Alternatively, increasing and/or reducing the operation may involve decreasing a number of transactions for one or more memory cells due to the proximity of the temperature of the IC 102. In yet another alternative, increasing and/or reducing the operation may involve increasing a number of transactions for one or more memory cells due to underutilization of the IC 102. Accordingly, controller 106 may continually adjust operation of the IC 102 based at least in part on the temperature of the IC 102. That is, as the IC temperature increases, controller 106 may adjust to reduce operation, and as the IC temperature decreases, controller 106 may adjust to increase operation.

Figure 2:
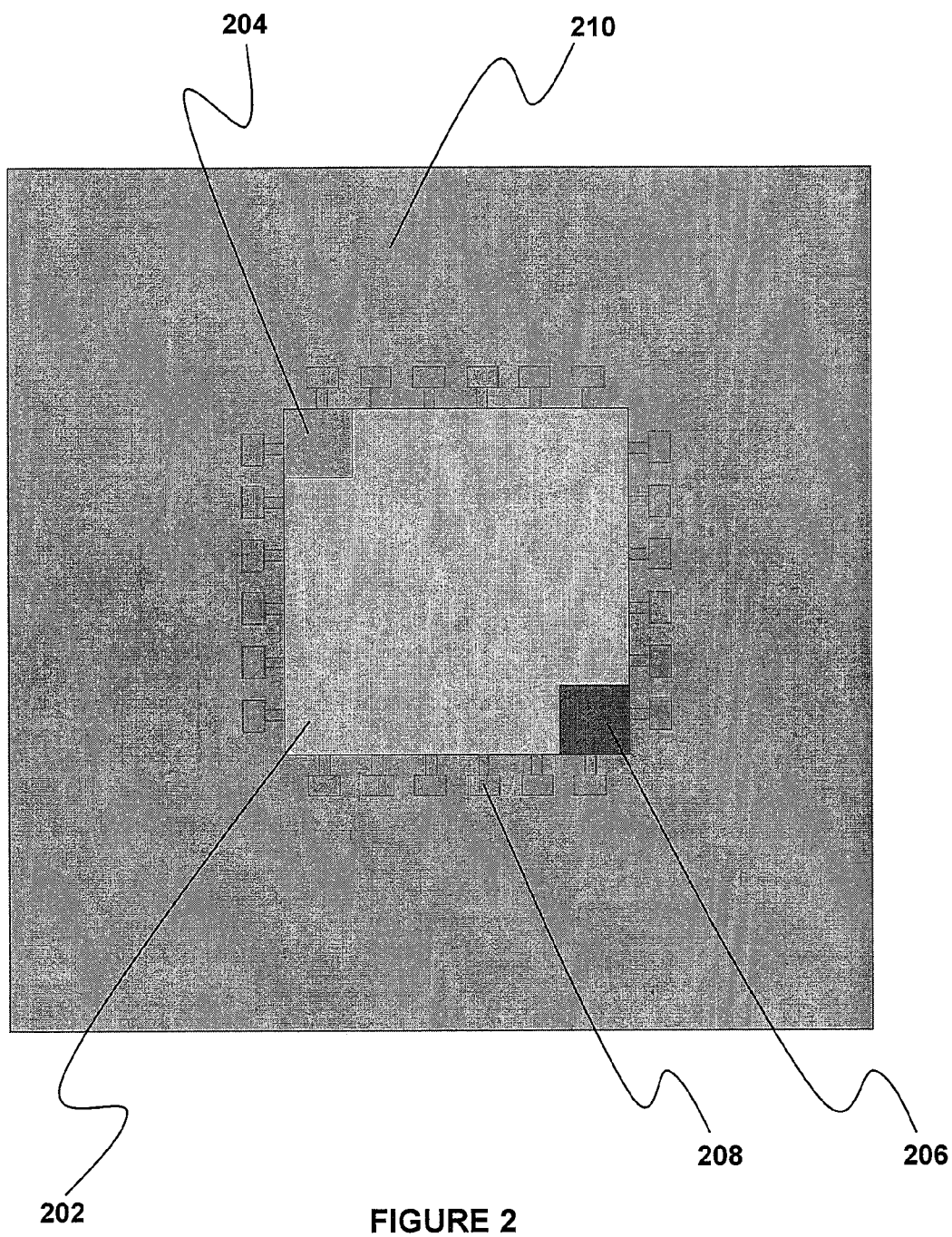
FIG. 2 illustrates schematically an IC in accordance with another embodiment of the claimed subject matter.

FIG. 2 illustrates schematically an IC in accordance with another embodiment of the claimed subject matter. In FIG. 2, an IC 202 may include a temperature sensor 204 and a controller 206. Additionally, IC 202 may have some contacts 208 and may be disposed on a package 210. In this particular illustrated embodiment, temperature sensor 204 and controller 206 may be included as part of the IC 202.

In the illustrated embodiment of FIG. 2, controller 206 may receive an indication of a proximity of a temperature of the IC 202 relative to a predetermined temperature, and responsive to the received indication, adjust operation of the IC 202 based at least in part on the proximity. Here again, it should be appreciated that IC 202 may comprise of a variety of IC such as, but not limited to, RAM type memory, CPU type IC device, GPU type IC device, and so forth.

Figure 3:
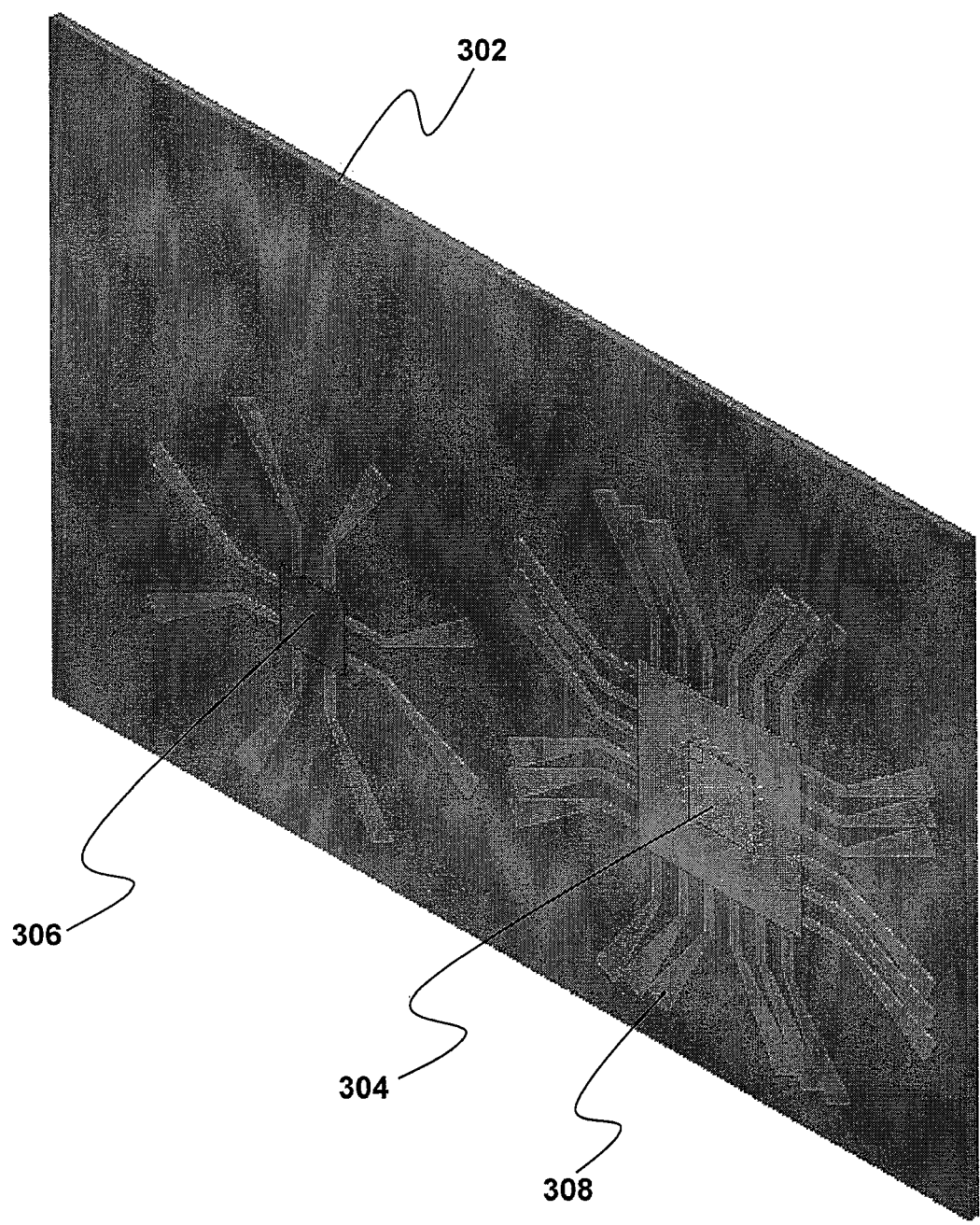
FIG. 3 illustrates schematically an electronic board having an apparatus for management of operation of an integrated circuit in accordance with one embodiment.

FIG. 3 illustrates schematically an electronic board having an apparatus for management operation of an integrated circuit in accordance with one embodiment. In FIG. 3, an electronic board 302 may include an IC 304 (similar to embodiments illustrated in FIGS. 1 & 2), and a controller 306 (similar to embodiments illustrated in FIGS. 1 & 2). Additionally, electronic board 302 may include tracings 308.

In the illustrated embodiment of FIG. 3, tracings 308 may facilitate communicative coupling of various components on the electronic board 302. For example, controller 306 may be communicatively coupled with IC 304 via tracings 308. However, it should be appreciated that the claimed subject matter is not limited in these respect because for example, various components may be communicatively coupled via various means such as, but not limited to, pins (not shown) and/or tracings, optical signals, wires, and so forth.

Continuing to refer to FIG. 3, it should be appreciated that tracings 308 are shown for illustration purposes, and accordingly, may not necessarily represent all of the tracings on an electronic board. Additionally, electronic board 302 may comprise of a variety of electronic boards such as, but not limited to, a printed circuit board (PCB). Further, electronic board 302 may comprise of a variety of electronic boards used for various applications such as, but not limited to, computer memory type board including single in-line memory module (SIMM), dual in-line memory module (DIMM), small outline dual in-line memory module (SODIMM), etc., and accordingly the claimed subject matter is not limited in these respects.

Shown in FIG. 3, controller 306 and IC 304 may reside on the same electronic board 302. However, as previously alluded to, controller 306 and IC 304 may reside on separate electronic boards such as in a non-limiting example, controller 306 may reside on a motherboard (not shown), while IC 304 may reside on a daughter board (similar to the electronic board 302 illustrated in the present figure). Again, irrespective of where controller 306 and IC 304 reside, controller 306 may be capable of being communicatively coupled with IC 304.

It should be pointed out here that for the purposes of describing the claimed subject matter, communicatively coupled may be utilized to refer to the ability of signals being transferred from one component to another and vice versa, and accordingly, is not limited in these respects.

Figure 4:
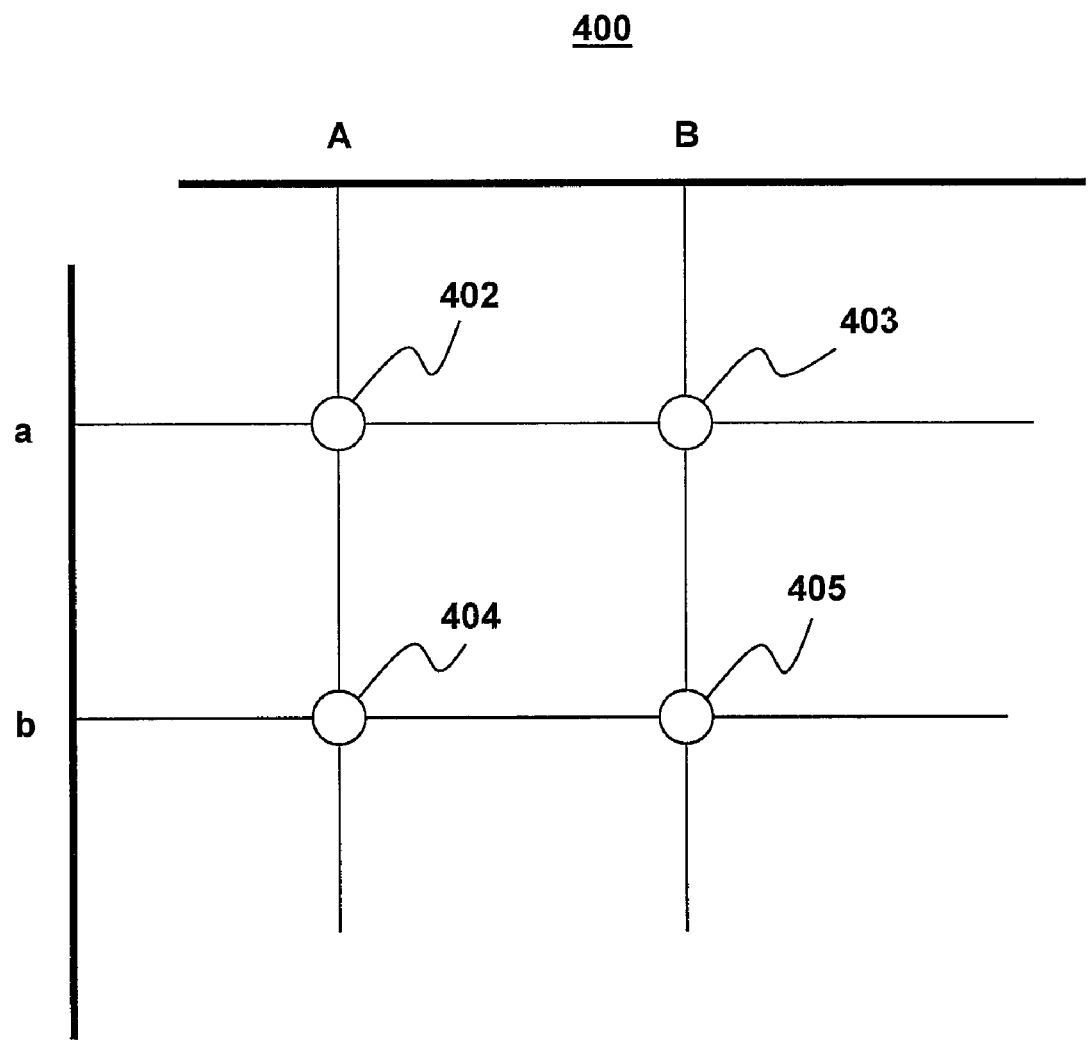
FIG. 4 illustrates schematically an example of operation of one or more memory cells in accordance with an embodiment of the claimed subject matter.

FIG. 4 illustrates schematically an example of operation of one or more memory cells in accordance with an embodiment of the claimed subject matter. In FIG. 4, an IC 400 may include memory cells 402-405 (shown here as a simplified pattern), and along with the memory cells 402-405, IC 400 may include bit lines A & B and word lines a & b. The location of the memory cells 402-405, may be referred to as an address. For example, memory cell 402, may have an address of Aa. It should be appreciated that for the purposes of illustration, each cell may represent devices such as, but not limited to, transistors, capacitors, and other variety of electronic devices (not shown).

Continuing to refer to FIG. 4, in a non-limiting example, if all of the memory cells 402-405 are read as 0 (may be referred to as low), the IC 400 may be considered operating normally (i.e., operating temperatures may be within various limits that may be predetermined by manufacturer and/or specification). One example of an operating limit may include an operating temperature limit of approximately 85 degrees Celsius. Effectively, memory cells 402-405 may operate as a temperature sensor (shown in FIGS. 1-3). If memory cell 402 were to be read as 1 (may be referred to as high), it may be an indication of IC 400 operating in a temperature that may be considered relatively close to the temperature limit of normal operation (i.e., a proximity of the temperature of the IC 400 relative to 85 degrees Celsius). A controller (shown in FIGS. 1-3), which may be communicatively coupled with the IC 400, may receive the indication of the proximity of the temperature of the IC 400 relative to 85 degrees. Responsive to the received indication, controller may adjust the operation of IC 400 based at least in part on the proximity. That is, adjustment of IC 400 may vary based upon the proximity. Continuing with this example, controller may reduce operation by a relatively small factor. For example, discontinue use of a small number of memory cells.

Continuing to refer to FIG. 4, if for example, all memory cells 402-405 were to go high, this may be an indication that the temperature of the IC 400 has reached or exceeded the limit of 85 degrees. Responsive to this received indication, controller may actually shut down IC 400. Accordingly, controller response to the received indication may be based at least in part on the proximity of the temperature of the IC 400 relative to the predetermined temperature.

In FIG. 4, four memory cells may be shown in order to describe the claimed subject matter. However, it should be appreciated that IC 400 may have any number of memory cells. Additionally, a number of memory cells may form a register, and accordingly, one or more registers may operate as a temperature sensor. Continuing to refer to the example above, the change in the state of the memory cells 402-405 may be facilitated by variety of means such as, but not limited to, a change in voltage and/or current associated with the memory cells 402-405. Further, change in current and/or voltage may be facilitated by utilizing physical properties within the IC 400 such as, but not limited to, dissimilar materials in proximate locations of the memory cells.

It should be appreciated that it is contemplated within the scope of the claimed subject matter that temperature sensor may comprise a variety of types of sensors such as, but not limited to, relative humidity sensor, motion sensor, bit error sensor, and so forth. Accordingly, the claimed subject matter is not limited in these respects.

Figure 5:
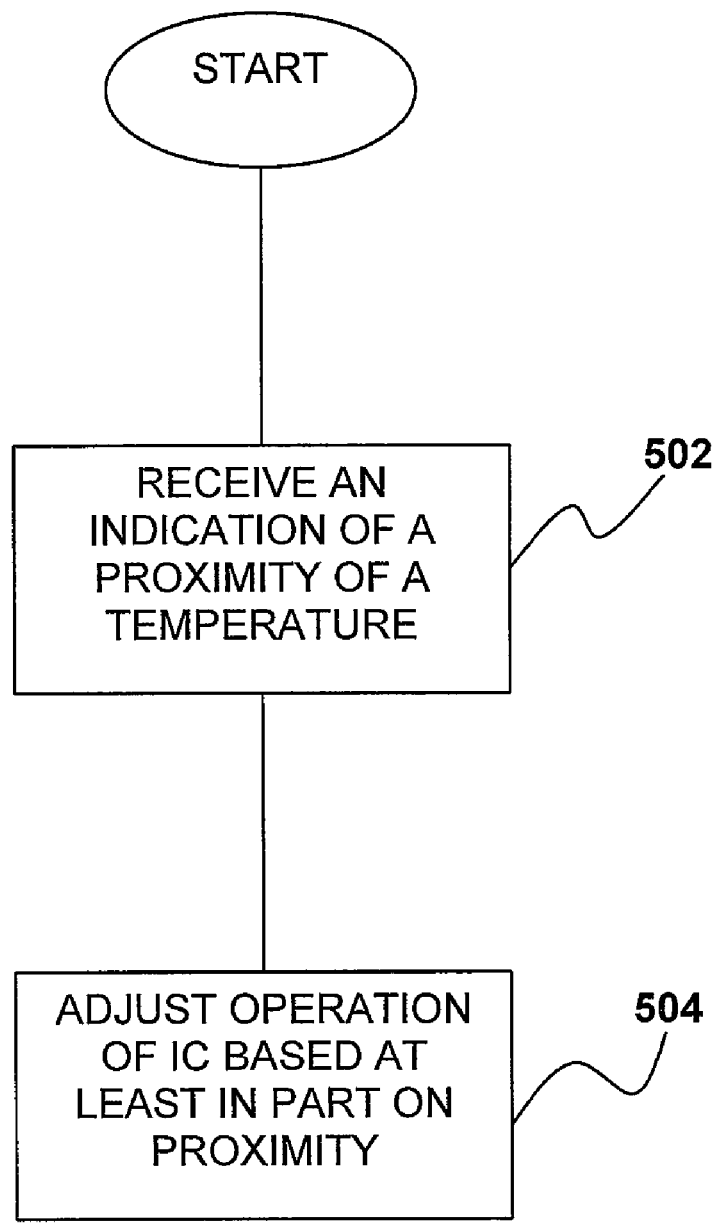
FIG. 5 illustrates an operational flow of management of an IC in accordance with one embodiment.

FIG. 5 illustrates an operation flow of management of an IC in accordance with one embodiment. In FIG. 5, a controller may receive an indication of a proximity of a temperature of an IC relative to a predetermined temperature at block 502. Responsive to the received indication, controller may adjust operation of the IC based at least in part on the proximity of the temperature of the IC relative to the predetermined temperature at block 504. As previously described, the response of the controller may be based at least in part on the closeness of the proximity to the predetermined temperature.

Figure 6:
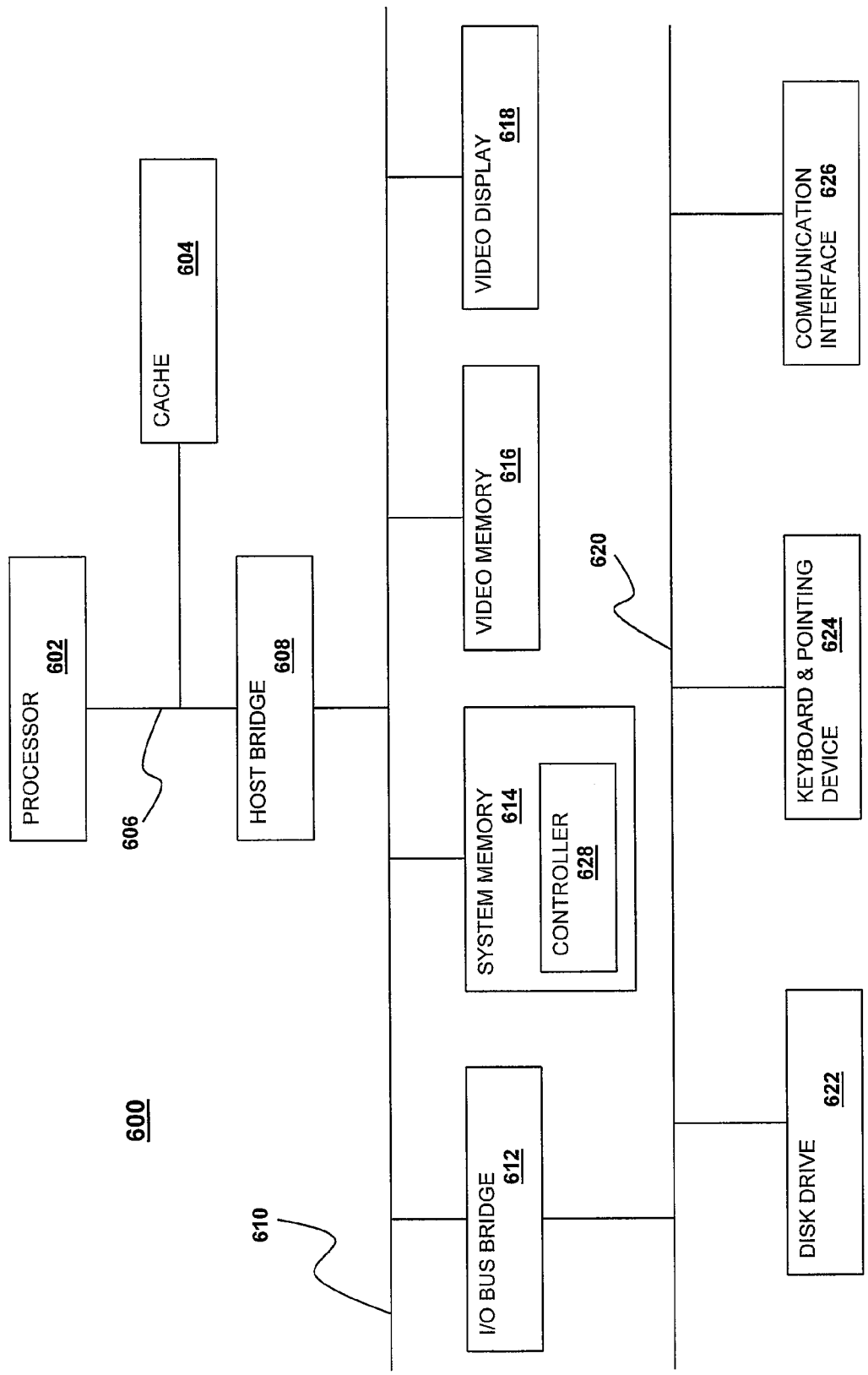
FIG. 6 illustrates one embodiment of a generic hardware system suitable to be programmed with an embodiment of the claimed subject matter.

FIG. 6 illustrates one embodiment of a generic hardware system suitable to be programmed with an embodiment of the claimed subject matter although claimed subject matter is not limited in scope in these respects. In the illustrated embodiment, hardware system 600 may include a processor 602, processor bus 606, high performance I/O bus 610, and standard I/O bus 620. Processor bus 606 and high performance I/O bus 610 may be bridged by host bridge 608, whereas I/O buses 610 and 620 may be bridged by I/O bus bridge 612. Communicatively coupled to high performance I/O bus 610 may be system memory 614 and video memory 616 against which video display 618 may be communicatively coupled. Additionally, system memory 614 may include controller 628. Communicatively coupled to standard I/O bus 620 may be disk drive 622, keyboard and pointing device 624, and communication interface 626.

Certain embodiments may include additional components, may not require all of the above components, and/or may combine one or more components. For example, system memory 614 and/or video memory 616 may be on-chip with processor 602. Alternatively, system memory 614 and/or video memory 616 may be eliminated and may be replaced with an electrically erasable programmable read only memory (EEPROM), wherein software routines are executed in place from the EEPROM. Additionally, controller 628 may be communicatively coupled on high performance I/O bus 610 as a separate component or it may be included as part of the processor 602. Some implementations may employ a single bus, to which all of the components are coupled, while other implementations may include one or more additional buses and/or bus bridges to which various additional components can be coupled. Additional components may include additional processors, a CD ROM drive, additional memories, and/or other peripheral components to be later developed.

Various functions and/or operations, as described above, may be implemented using one or more of a wide range of hardware systems. In one embodiment, functions may be implemented as instructions and/or routines that may be executed by one or more execution units, such as processor 602 for example, within one or more hardware system(s). These machine executable instructions may be stored using any article accessible medium such as, but not limited to, a machine readable storage medium, including internal memory, such as memories 614 and 616, as well as various external and/or remote memories, such as a hard drive, diskette, CD-ROM, magnetic tape, digital video or versatile disk (DVD), laser disk, Flash memory, network server, etc. In one implementation, these software routines may be written in a programming language such as, but not limited to, the C, C+, or C++ programming language. It should be appreciated, however, that these routines may be implemented in any of a wide variety of programming languages.

In alternate embodiments, various functions and/or operations of the embodiments may be implemented in discrete hardware and/or firmware. For example, one or more application specific integrated circuits (ASICs) may be programmed with one or more of the above-described functions. In another example, one or more functions may be implemented in one or more ASICs on additional circuit boards and/or the circuit boards could be inserted into the system(s) described above. In another example, one or more programmable gate arrays (PGAs) may be used to implement one or more functions and/or operations. In yet another example, a combination of hardware and/or software may be used to implement one or more functions and/or operations.

While there has been illustrated and/or described what are presently considered to be example embodiments of claimed subject matter, it will be understood by those skilled in the art that various other modifications may be made, and/or equivalents may be substituted, without departing from the true scope of claimed subject matter. Additionally, many modifications may be made to adapt a particular situation to the teachings of claimed subject matter without departing from subject matter that is claimed. Therefore, it is intended that the patent not be limited to the particular embodiments disclosed, but that it covers all embodiments falling within the scope of the appended claims.

What is claimed is:

1. A method comprising:
sensing a proximity of a temperature of an integrated circuit (IC) to a specified temperature by changing one or more binary values stored in respective one or more memory cells at least in part in response to a change of voltage and/or current applied to the one or more memory cells, wherein said change of voltage and/or current is responsive to a change in the temperature of the IC in the proximity of the one or more memory cells, said change of said one or more binary values stored in the respective one or more memory cells to indicate the proximity of the temperature of the IC to the specified temperature; and
adjusting operation of the IC based at least in part on the proximity of the temperature of the IC to the specified temperature.

2. The method of claim 1, wherein said change of voltage and/or current applied to the one or more memory cells is responsive at least in part to a change of temperature of dissimilar materials in a proximate location to the one or more memory cells.

3. The method of claim 1, further comprising receiving an indication of a proximity of an additional temperature in the IC to the specified temperature from a temperature sensor in the IC.

4. The method of claim 3, wherein said receiving the indication from the temperature sensor in the IC comprises receiving the indication of the change in the IC by indicating a change in voltage and/or current associated with a predetermined portion of the IC.

5. The method of claim 3, wherein said receiving the indication of the proximity of the additional temperature in the IC to the specified temperature comprises receiving the indication at a memory controller.

6. The method of claim 3, wherein said receiving the indication of the proximity of the additional temperature in the IC to the specified temperature comprises receiving the indication of the proximity of the additional temperature at a controller included as part of the IC.

7. The method of claim 3, wherein said receiving the indication of the proximity of the additional temperature in the IC to the specified temperature comprises receiving an indication of a change in one or more binary values of an additional respective one or more memory cells, wherein the additional one or more memory cells are included as part of the IC.

8. The method of claim 1, wherein said adjusting comprises interrupting the operation of the IC.

9. The method of claim 8, wherein said interrupting comprises adjusting an operating frequency of the IC.

10. The method of claim 1, wherein said adjusting comprises adjusting operation of an additional one or more memory cells included as part of the IC.

11. The method of claim 1, wherein the specified temperature comprises a value approximately equal to a critical value that indicates a need to change activity of the IC to avoid exceeding the critical value.

12. An apparatus comprising:
an integrated circuit (IC);
a temperature sensor comprising one or more memory cells to store respective one or more binary values, said one or more binary values to change state at least in part in response to a change in voltage and/or current applied to said one or more memory cells, the voltage and/or current applied to said memory cells to change at least in part in response to a change in a temperature of the IC in proximity of the one or more memory cells, and the temperature sensor included as part of the IC; and
a controller communicatively coupled with the IC and the temperature sensor, the controller adapted to receive an indication of a proximity of the temperature of the IC relative to a specified temperature from the temperature sensor and adjusting operation of the IC based at least in part on the proximity of the temperature of the IC relative to the specified temperature.

13. The apparatus of claim 12, wherein the IC comprises a computer memory.

14. The apparatus of claim 12, wherein the temperature sensor comprises a temperature sensor to provide an indication of a change in an IC.

15. The apparatus of claim 14, wherein the change in the IC comprises a change in voltage and/or current associated with a predetermined portion of the IC approximately at the one or more memory cells.

16. The apparatus of claim 12, the voltage and/or current applied to said memory cells to change at least in part in response to a change of temperature of dissimilar materials in a proximate location to the one or more memory cells.

17. The apparatus of claim 12, wherein the controller comprises a controller to interrupt an operation of the IC.

18. The apparatus of claim 17, the controller to interrupt the operation of the IC by adjusting an operating frequency of the IC.

19. The apparatus of claim 12, wherein the controller comprises a controller included as part of the IC.

20. An article comprising: a storage medium having stored thereon instructions executable by a processor to:
receive an indication of a proximity of a temperature of an integrated circuit (IC) to a specified temperature from one or more memory cells, said one or more memory cells to store a respective one or more binary values, said one or more binary values to change at least in part in response to a change in a voltage and/or current applied to the memory cells, the voltage and/or current to change at least in part in response to a change in the temperature of the IC in a proximity of the one or more memory cells; and
adjust an operation of the IC based at least in part on the proximity of the temperature of the IC relative to the specified temperature.

* * * * *